United States Patent
Igarashi et al.

(10) Patent No.: US 8,310,141 B2
(45) Date of Patent: Nov. 13, 2012

(54) FLUORESCENT LAMP, LIGHT SOURCE APPARATUS AND DISPLAY APPARATUS

(75) Inventors: Takahiro Igarashi, Kanagawa (JP); Tsuneo Kusunoki, Kanagawa (JP)

(73) Assignee: Sony Corporation, Tokyo (JP)

( * ) Notice: Subject to any disclaimer, the term of this patent is extended or adjusted under 35 U.S.C. 154(b) by 501 days.

(21) Appl. No.: 12/063,737

(22) PCT Filed: Jul. 2, 2007

(86) PCT No.: PCT/JP2007/063246
§ 371 (c)(1),
(2), (4) Date: Feb. 13, 2008

(87) PCT Pub. No.: WO2008/013029
PCT Pub. Date: Jan. 31, 2008

(65) Prior Publication Data
US 2010/0142184 A1 Jun. 10, 2010

(30) Foreign Application Priority Data
Jul. 25, 2006 (JP) ................. 2006-202368

(51) Int. Cl.
*G09F 13/08* (2006.01)
*H01J 61/44* (2006.01)
(52) U.S. Cl. ........ 313/487; 313/643; 313/543; 313/467; 313/503

(58) Field of Classification Search ............ 252/301.4 P, 252/301.4 R; 313/643, 543, 467, 486, 503, 313/487
See application file for complete search history.

(56) References Cited

U.S. PATENT DOCUMENTS

| | | | |
|---|---|---|---|
| 4,038,204 A * | 7/1977 | Wachtel .................. 252/301.4 P |
| 4,353,808 A * | 10/1982 | Tanimizu et al. ....... 252/301.4 P |
| 2003/0155857 A1 | 8/2003 | Soules et al. |
| 2003/0218415 A1* | 11/2003 | Matsuo .......................... 313/485 |
| 2005/0062397 A1 | 3/2005 | Izumi et al. |
| 2005/0258733 A1* | 11/2005 | Igarashi et al. ............... 313/487 |
| 2006/0214581 A1 | 9/2006 | Hara |

FOREIGN PATENT DOCUMENTS

WO 2005/074005 8/2005
WO 2007/013688 A2 2/2007

OTHER PUBLICATIONS

Japanese Office Action issued on Sep. 15, 2009, for corresponding Japanese Patent Application JP 2006-202368.
European Search Report issued Mar. 6, 2012, for corresponding European Appln. No. 07768021.3.

* cited by examiner

*Primary Examiner* — Anne Hines
*Assistant Examiner* — Jacob R Stern
(74) *Attorney, Agent, or Firm* — K&L Gates LLP

(57) ABSTRACT

In a fluorescent lamp, an initial chromaticity change can be suppressed. An atmosphere in contact with a blue light-emission phosphor forming a phosphor particle layer 3 that contains argon (Ar) and neon (Ne) shown by the following equation $A/(A+N) \geq 0.04$, wherein A represents a mole fraction of argon and N represents a mole fraction of neon.

8 Claims, 5 Drawing Sheets

FLUORESCENT LAMP, LIGHT SOURCE APPARATUS AND DISPLAY APPARATUS

TECHNICAL FIELD

The present invention relates to a fluorescent lamp including phosphors, to a light source apparatus including the fluorescent lamp, and to a display apparatus including the light source apparatus.

BACKGROUND ART

A display apparatus such as a liquid-crystal display incorporates therein a light source apparatus in the form of a backlight thereof. As examples of light sources forming the light source apparatus includes a fluorescent lamp including a phosphor particle layer containing a plurality of phosphors. Specifically, fluorescent lamps include a cold cathode fluorescent lamp (Cold Cathode Fluorescent Lamp; CCFL) and a hot cathode fluorescent lamp (Hot Cathode Fluorescent Lamp; HCFL) (for example, see Patent Document 1).

An example of a related-art phosphor particle layer includes a blue light-emission phosphor $BaMgAl_{10}O_{17}$:Eu (called BAM:Eu), a green light-emission phosphor $LaPO_4$:Ce,Tb (called LAP), and a red light-emission phosphor $Y_2O_3$:Eu (called YO) as a plurality of kinds of phosphors.

It should be noted that a compositional formula of each phosphor indicates a host material and a luminescent center. For example, in the aforementioned BAM:Eu, a portion of $BaMgAl_{10}O_{17}$ represents a host material, and a portion of Eu represents a luminescent center. When the blue light-emission phosphor is expressed by BAM:Eu, a concentration of a luminescent center can optionally determined.

The blue phosphor BAM:Eu has been widely used because the BAM:Eu includes a high luminous efficiency; however, in recent years, since members (color filters, optical sheets, etc.) forming a display apparatus has an improved performance, and hence the display apparatus can finally output light having a certain brightness or higher, it may not be necessary to select a phosphor with a priority of a luminous efficiency.

However, although the BAM:Eu is the blue light-emission phosphor, BAM:Eu,Mn dissolving Mn shows green and a blue light-emission phosphor not dissolving Mn contains much of light in a green region. That is, it is difficult for the BAM:Eu to exhibit excellent in color purity of a blue region.

In contrast, attention has been drawn to another blue light-emission phosphor $(Sr_x,Ba_y,Ca_{(1-x-y)})_5(PO_4)_3Cl$:Eu (where $0 \leq x$, $y \leq 1$ and $x+y \leq 1$); that is, a so-called SCA. As shown in FIG. 5, an emission spectrum (solid line a) of the SCA has a steep spectrum shape with a narrow half width as compared with an emission spectrum (dot and dash line b) of the BAM:Eu. That is, the SCA exhibits excellent blue with high color purity as compared with the BAM:Eu.

However, having conducted extensive studies, the inventors of the present invention have pointed out that a specific problem; that is, a luminescent chromaticity a change in time in a fluorescent lamp containing a SCA on a phosphor particle layer.

In order to examine a change in luminescent chromaticity, a first CCFL and a second CCFL are prepared, each of which is incorporated in a display apparatus, and a change in chromaticity is measured in the display apparatuses having respective CCFLs. The first CCFL includes SCA, BAM:Eu, Mn and $YVO_4$:Eu as phosphors, and the second CCFL includes BAM:Eu, BAM:Eu,Mn and $YVO_4$:Eu as phosphors.

The first and second CCFLs are incorporated into backlight (light source apparatus) of 32-inch liquid-crystal displays, respectively. Then, a change in chromaticity on the surfaces of the respective displays is measured. The change in chromaticity is normally observed after turning ON the power of the display. The change in chromaticity ($\Delta x$, $\Delta y$) is measured after three seconds from turning the power ON, and the resulting chromaticity is evaluated in a duration from an onset to 120 seconds after the measurement.

The results show that a change in chromaticity of the first CCFL is ($\Delta x=+5/1000$, $\Delta y=-33/1000$) and a change in chromaticity of the second CCFL is ($\Delta x=0/1000$, $\Delta y=-8/1000$). That is, the change in chromaticity obtained after 120 seconds in the liquid-crystal display using the SCA as the blue light-emission phosphor is larger than that in the liquid-crystal display using the BAM:Eu as the blue light-emission phosphor. In particular, a significantly large change in y value is observed in the liquid-crystal display using the SCA.

As described above, if chromaticity (initial chromaticity) of the fluorescent lamp continues to change immediately after light emission is started, output image information continues to deteriorate due to fundamentally unrelated factors to the image information in the display apparatus having the fluorescent lamp as a light source. The image with such deterioration exhibits unnatural image as a whole.

Accordingly, instability in the fluorescent lamp forming the light source of the display apparatus may cause adverse effects on images through deterioration of image information in the display apparatus, such as unpleasant impression given to viewers who eventually watch such images.

[Patent Document 1]: Unexamined Published Japanese Patent Application No. 2005-332625

DISCLOSURE OF INVENTION

In view of the aforementioned problems, it is an object of the present invention to provide a fluorescent lamp in which a change in chromaticity can be suppressed even when the fluorescent lamp has a SCA as a blue light-emission phosphor, a light source apparatus including the fluorescent lamp and a display apparatus including the light source apparatus.

A fluorescent lamp according to the present invention includes at least a blue light-emission phosphor expressed by the following compositional formula:

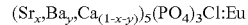

wherein $0 \leq x$, $y \leq 1$ and $x+y \leq 1$, and an atmosphere in contact with the blue light-emission phosphor that contains argon (Ar) and neon (Ne) shown by the following equation:

$$A/(A+N) \geq 0.04$$

wherein A represents a mole fraction of argon and N represents a mole fraction of neon.

A light source apparatus according to the present invention includes a fluorescent lamp, where the fluorescent lamp includes at least the blue light-emission phosphor expressed by the following compositional formula:

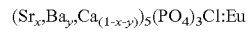

wherein $0 \leq x$, $y \leq 1$ and $x+y \leq 1$, and an atmosphere in contact with the blue light-emission phosphor that contains argon (Ar) and neon (Ne) shown by the following equation:

$$A/(A+N) \geq 0.04$$

wherein A represents a mole fraction of argon and N represents a mole fraction of neon.

A display apparatus according to the present invention includes a light source apparatus having a fluorescent lamp that contains at least a blue light-emission phosphor expressed by the following compositional formula:

$$(Sr_x,Ba_y,Ca_{(1-x-y)})_5(PO_4)_3Cl:Eu$$

wherein $0 \leq x, y \leq 1$ and $x+y \leq 1$, and an atmosphere in contact with the blue light-emission phosphor that contains argon (Ar) and neon (Ne) shown by the following equation:

$$A/(A+N) \geq 0.04$$

wherein A represents a mole fraction of argon and N represents a mole fraction of neon.

According to the fluorescent lamp of the present invention, since the atmosphere in contact with the blue light-emission phosphor is expressed by the following equation:

$$A/(A+N) \geq 0.04,$$

a change in initial chromaticity can be suppressed.

According to the light source apparatus of the present invention, since the atmosphere of the fluorescent lamp in contact with the blue light-emission phosphor is that expressed by the following equation:

$$A/(A+N) \geq 0.04,$$

it may become possible to supply light with stable chromaticity to the fluorescent lamp by suppressing a change in initial chromaticity.

According to the display apparatus of the present invention, since the atmosphere of the fluorescent lamp in contact with the blue light-emission phosphor is that expressed by the following equation:

$$A/(A+N) \geq 0.04,$$

deterioration of image information can be decreased by suppressing a change in initial chromaticity in the fluorescent lamp.

BEST MODE FOR CARRYING OUT THE INVENTION

Embodiments of the present invention will be described below with reference to the drawings.

<Embodiment of Fluorescent Lamp>

An embodiment of a fluorescent lamp according to the present invention will be described.

Figure 1:
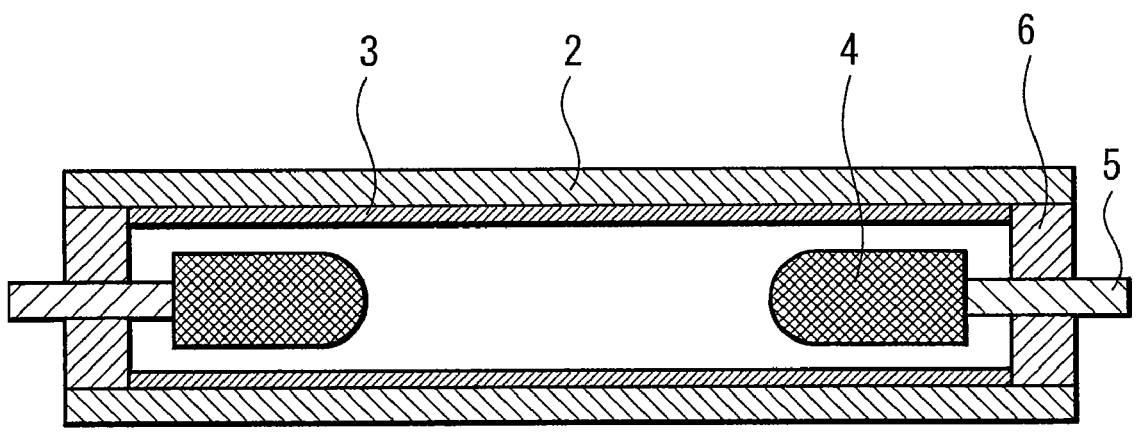
FIG. 1 is a schematic configuration diagram showing an example of a fluorescent lamp according to the present invention.

FIG. 1 is a schematic configuration diagram of a fluorescent lamp according to an embodiment of the present invention.

In a fluorescent lamp 1 according to the embodiment of the present invention, as shown in FIG. 1, a phosphor particle layer containing a blue light-emission phosphor, a green light-emission phosphor and a red light-emission phosphor expressed by the following compositional formula:

$$(Sr_x,Ba_y,Ca_{(1-x-y)})_5(PO_4)_3Cl:Eu$$

is coated on the inner surface of a glass tube 2 as will be described later. Dumet wires 5 with electrodes provided at tip ends thereof are inserted from both open ends of the glass tube 2. Then, clearances between the dumet wire 5 and the glass tube 2 are blocked with bead glass 6, so that an atmosphere in contact with the blue light-emission phosphor is hermetically sealed within the inner space enclosed by the glass tube 2, the dumet wires 5, and the bead glass 6.

It should be noted that various green phosphors can be used as a green light emission phosphor, an example of which includes BAM:Eu,Mn. Similarly, various red phosphors can be used as a red light emission phosphor, an example of which includes $YVO_4$:Eu. Two or more kinds of phosphors may be used in each phosphor for a corresponding color.

The fluorescent lamp 1 is used as a hot cathode fluorescent lamp when electrons are discharged (thermal electron radiation) by heating the electrode 4, and the fluorescent lamp 1 is used as a cold cathode fluorescent lamp when electrons are discharged by applying a high voltage to the electrode 4 to move the electrons at high speed within the glass tube.

An atmosphere enclosed within the inner space of the fluorescent lamp 1 according to the embodiment of the present invention contains at least argon (Ar), neon (Ne), and mercury (Hg). Mercury is excited by discharging electrons in the electrode 4 to radiate ultraviolet light. The thus radiated ultraviolet light can excite respective phosphors forming the phosphor particle layer 3.

Also, as will be described later, the atmosphere is formed with a ratio expressed by the following equation:

$$A/(A+N) \geq 0.04$$

wherein A represents a mole fraction of argon and N represents a mole fraction of neon. In the fluorescent lamp 1 according to the embodiment of the present invention in which the ratio of argon and neon in the atmosphere in contact with the blue light-emission phosphor is selected as described above, a change in initial chromaticity can be suppressed as will be described later.

<Embodiments of Light Source Apparatus and Display Apparatus>

Embodiments of a light source apparatus and a display apparatus according to the present invention will be described.

It should be noted that the embodiments of the present invention will be described as an example in which a light source apparatus including a fluorescent lamp constructs a backlight of a display apparatus.

Figure 2:
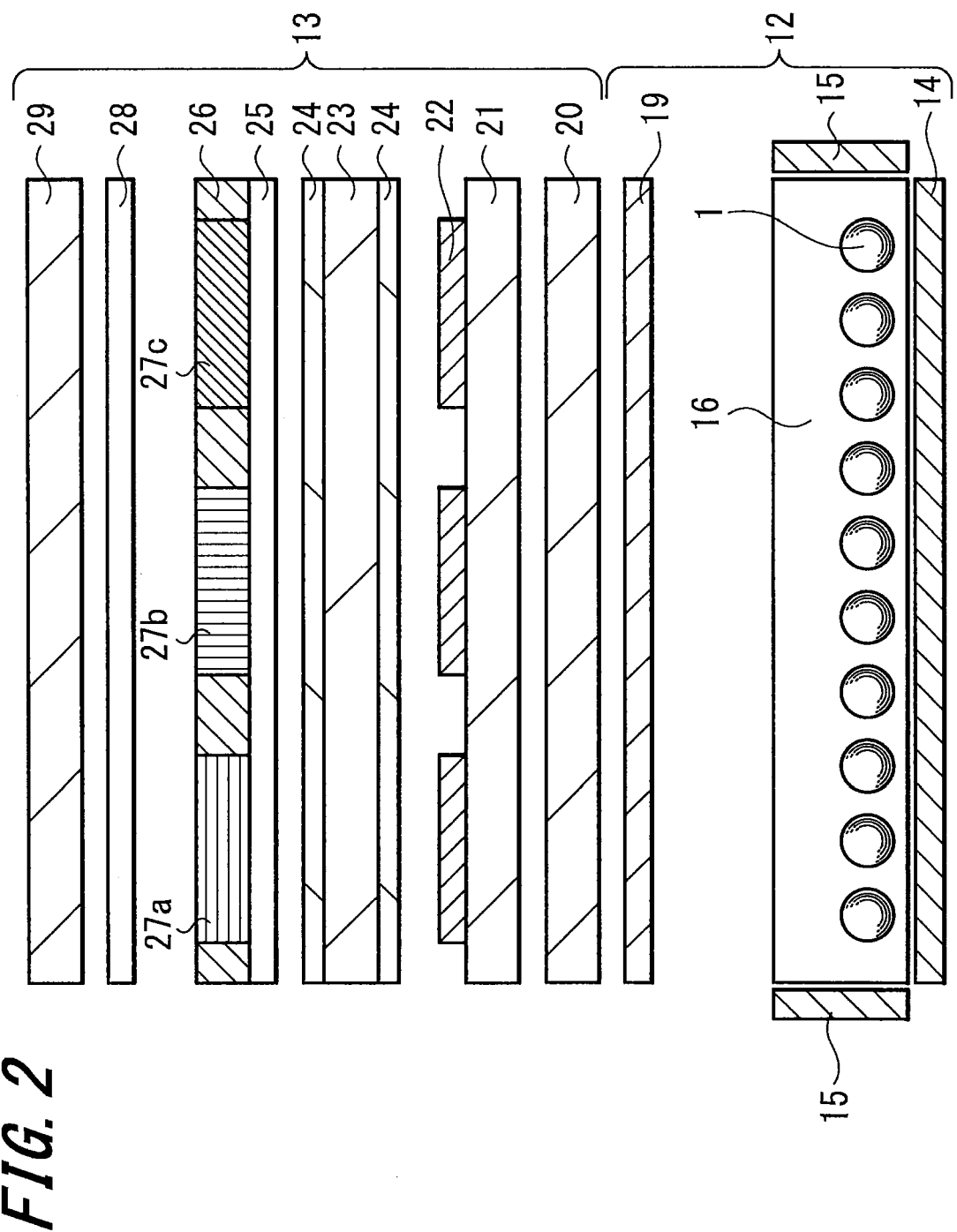
FIG. 2 is a schematic configuration diagram showing examples of a light source apparatus and a display apparatus according to the present invention having a fluorescent lamp of the present invention.

FIG. 2 shows a schematic configuration diagram of a display apparatus including a light source apparatus according to the embodiment of the present invention.

A display apparatus 11 according to the embodiment of the present invention includes a light source apparatus 12 and an optical apparatus 13.

In the embodiment of the present invention, the light source apparatus 12 is utilized as a backlight apparatus for the optical apparatus 13 including a liquid-crystal apparatus.

The light source apparatus 12 includes a light guide portion 16 made of resin in which the fluorescent lamp 1 is provided.

Moreover, in the embodiment of the present invention, the light source apparatus 12 includes a diffusion sheet 19 provided on the closest portion facing the optical apparatus 13. The diffusion sheet 19 is used to guide light from the blue light source and respective phosphors to the optical apparatus 13 in order to uniformly provide light in a plane. A reflector 14 is provided at the back of the light source apparatus 12. A reflector 15 similar to the reflector 14 is also provided at the side surface of the light guide portion 16.

It should be noted that, in the light source apparatus 12 according to the embodiment of the present invention, various transparent resins can be used as the resin forming the light guide portion 16 in addition to epoxy resin, silicon resin, and urethane resin. Various shapes such as a side-emitter type or a shell type can be optionally employed for the blue light source forming the illuminant.

In contrast, in the embodiment of the present invention, the optical apparatus 13 is a liquid-crystal apparatus that can output predetermined output light by modulating light from the light source apparatus 12.

In the optical apparatus 13, the following are provided in the order from the side close to the light source apparatus 12: a deflection plate 20, a TFT (Thin Film Transistor: thin film transistor) glass substrate 21, dot electrodes 22 on the surface of the glass substrate, a liquid-crystal layer 23, orientation films 24 deposited on the front and back of the liquid-crystal layer, an electrode 25, a plurality of black matrices 26 on the electrode 25, a first (red) color filter 27a, a second (green) color filter 27b and a third color filter 27c corresponding to pixels between the black matrices 26, a glass substrate 28 distant from the black matrices 26 and the color filters 27a to 27c and a deflection plate 29.

Here, the deflection plates 20 and 29 are provided so as to form light which vibrates in the specific direction. The TFT glass substrate 21, the dot electrodes 22, and the electrode 25 are provided in order to switch the liquid-crystal layer 23 that passes only light vibrating in the specific direction. Since the orientation films 24 are provided with the glass substrate, the dot electrodes and the electrode, inclinations of liquid-crystal molecules within the liquid-crystal layer 23 are arranged in predetermined directions. Since the optical apparatus 13 includes the black matrices 26, contrasts of light output from the color filters 27a to 27c corresponding to the respective colors can be improved. These black matrices 26 and color filters 27a to 27c are attached to the glass substrate 28.

The display apparatus 11 according to the embodiment of the present invention includes the light source apparatus 12 in which atmosphere of the fluorescent lamp 1 is formed with a ratio expressed by the following equation:

$$A/(A+N) \geqq 0.04,$$

regarding mole fractions of argon and neon. Accordingly, in the fluorescent lamp 1 according to the embodiment of the present invention, a change in initial chromaticity of the fluorescent lamp 1 can be suppressed and light with stable chromaticity is supplied from the light source apparatus 12. As a result, deterioration of image information can be decreased.

EXAMPLES

Examples of the present invention will be described.

In the following examples, results obtained when properties of the fluorescent lamp 1 according to the embodiment of the present invention were evaluated will be described.

When properties of the fluorescent lamp 1 are evaluated as follow; while changing a compositional ratio of the blue light-emission phosphor forming the phosphor particle layer 3 of the fluorescent lamp 1, the mole ratio in the atmosphere in contact with this blue light-emission phosphor obtained by the equation $A/(N+A)$ was varied in a range of 0.03 to 0.10, and whether or not a change in initial chromaticity falls within an allowable range was determined based on a subjective evaluation by visual observation. Specifically, 10 subjects were asked to observe a change in colors for 120 seconds after the power switch of the display apparatus has been turned ON. The subjects were then asked to determine whether or not the change in color they observed was significant. The ratio obtained by the equation $A/(N+A)$, of which six or more subjects of ten had reported that the change in initial chromaticity was insignificant was determined as a preferable ratio. In order to evaluate the properties of the fluorescent lamp from the view point closer to consumers, images of a television program with ground wave broadcasting were used for the evaluation.

It should be noted that a change in initial chromaticity was not evaluated by objective evaluation based on numerical values, because the evaluation of a display is frequently determined by viewer's subjectivity. Specifically, with delicate properties such as deterioration in colors, there will be a difference in the evaluation between the objective evaluation based on numerical values and the subjective evaluation based on visual observation. Thus, the objective evaluation may not necessarily be a best suited for viewers.

First, as a first example, properties of a fluorescent lamp using a phosphor expressed by the compositional formula $Sr_5(PO_4)_3Cl:Eu$ as a blue light emission phosphor were evaluated. Results are shown on a table 1.

It should be noted that a green light emission phosphor forming a fluorescent lamp is BAM:Eu,Mn and a red light emission phosphor is $YVO_4:Eu$. A fluorescent lamp was manufactured such that, after a suspension prepared by mixing three kinds of phosphors into a solution in which nitrocellulose was dissolved into an organic solvent was poured into the glass tube 2 and dried, an excitation gas (mercury, rare gas, etc.) was enclosed into the glass tube, electrodes being attached to the glass tube.

TABLE 1

| A/(A + N) | 0.03 | 0.04 | 0.05 | 0.06 | 0.07 | 0.08 | 0.09 | 0.10 |
| --- | --- | --- | --- | --- | --- | --- | --- | --- |
| Number of subjects reported a change was insignificant | 2 | 6 | 6 | 6 | 6 | 8 | 8 | 10 |

The results on the table 1 shows that an initial chromaticity distribution can be suppressed sufficiently provided that the ratio obtained by the equation A/(N+A) was equal to or greater than 0.04 in the first example.

Next, as a second example, properties of a fluorescent lamp using $(Sr_{0.5},Ba_{0.5})_5(PO_4)_3Cl:Eu$ as a blue light emission phosphor were evaluated. Results are shown on a table 2. It should be noted that a fluorescent lamp manufacturing method and a green light emission phosphor and a red light emission phosphor forming the fluorescent lamp are similar to those of the first example.

TABLE 2

| A/(A + N) | 0.03 | 0.04 | 0.05 | 0.06 | 0.07 | 0.08 | 0.09 | 0.10 |
|---|---|---|---|---|---|---|---|---|
| Number of subjects reported a change was insignificant | 4 | 7 | 7 | 7 | 7 | 8 | 8 | 10 |

The results on the table 2 shows that a change in initial chromaticity can be suppressed sufficiently provided that the ratio obtained by the equation A/(N+A) was equal to or greater than 0.04 in the second example.

Next, properties of a fluorescent lamp using $(Sr_{0.3},Ba_{0.3},Ca_{0.4})_5(PO_4)_3Cl:Eu$ as a blue light emission phosphor were evaluated. Results are shown on a table 3. It should be noted that a fluorescent lamp manufacturing method and a green light emission phosphor and a red light emission phosphor forming the fluorescent lamp are similar to those of the first example.

TABLE 3

| A/(A + N) | 0.03 | 0.04 | 0.05 | 0.06 | 0.07 | 0.08 | 0.09 | 0.10 |
|---|---|---|---|---|---|---|---|---|
| Number of subjects reported a change was insignificant | 1 | 6 | 7 | 6 | 7 | 8 | 9 | 10 |

The results on the table 3 shows that a change in initial chromaticity can be sufficiently suppressed provided that the ratio obtained by the equation A/(N+A) was equal to or greater than 0.04 in the third example. It should be noted that the evaluated results in this example indicates that a change in initial chromaticity can be suppressed at a particularly high level provided that the ratio obtained by the equation A/(N+A) was equal to or greater than 0.05.

It should be noted that a change in initial chromaticity of the fluorescent lamp according to the first example were measured. Results are shown in FIG. 3.

Figure 3:
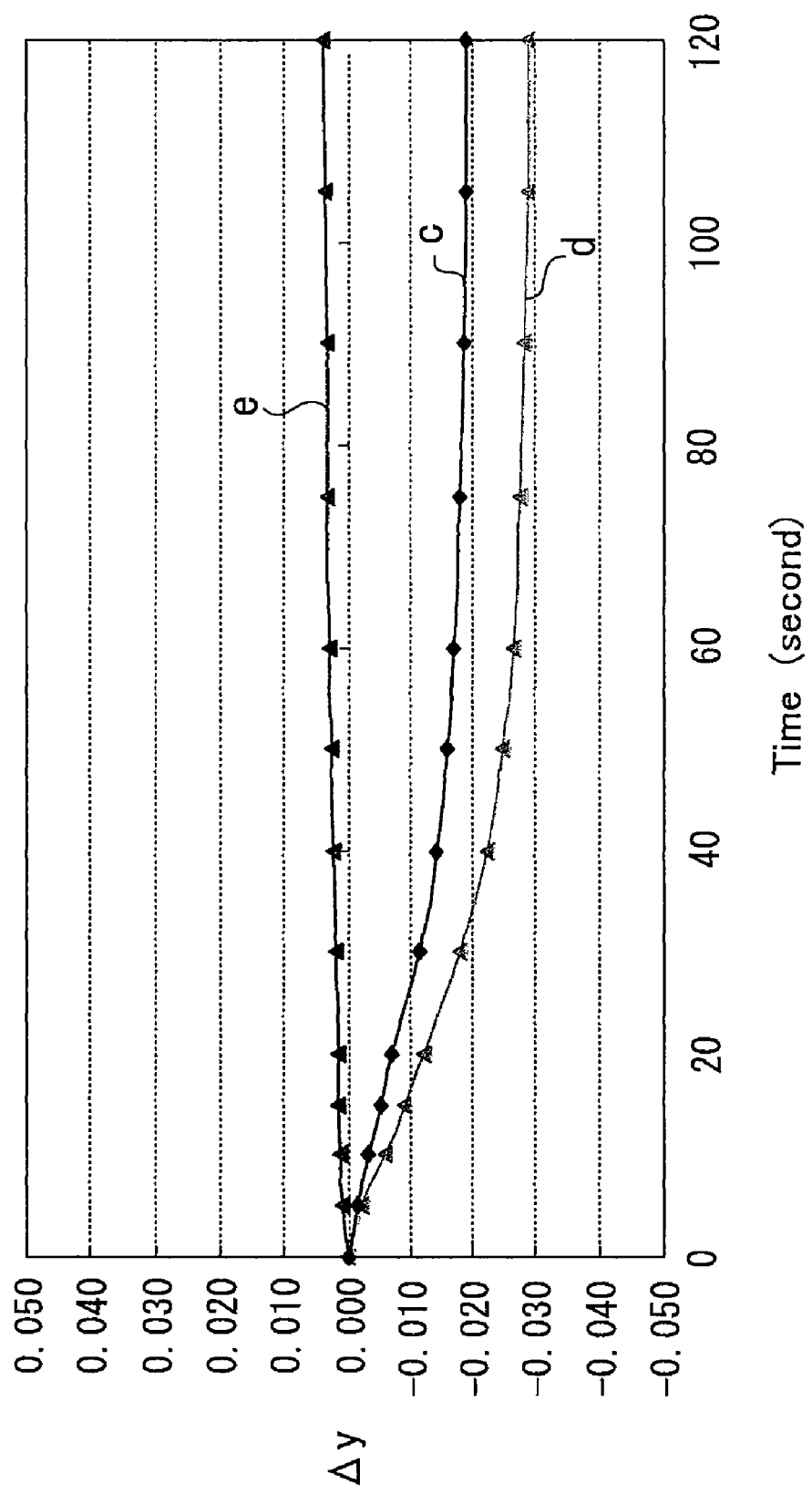
FIG. 3 is a schematic diagram illustrating photoluminescence properties of a phosphor.

As shown in FIG. 3, the measured results shows that when the ratio obtained by the equation A/(N+A) was 0.04 (shown by c), a change in initial chromaticity can be suppressed more as compared with a related art fluorescent lamp in which the ratio obtained by the equation A/(N+A) was 0.03 (shown by d). The change in initial chromaticity can be suppressed in the fluorescent lamp according to the second example and the fluorescent lamp according to the third example in which compositional ratios of phosphors are partly different.

It should be noted that, even though the fluorescent lamp (shown by c) has larger a change in initial chromaticity than those of a fluorescent lamp (shown by e) using BAM:Eu as a blue light emission phosphor, excellent properties such as high color purity can be obtained as mentioned hereinbefore. Specifically, the results in FIG. 3 shows that, according to the fluorescent lamp of the embodiment of the present invention, the fluorescent lamp had both practical use such as having a small change in initial chromaticity and exhibited excellent properties.

Next, the result where a change in initial chromaticity was particularly suppressed in the fluorescent lamp according to the embodiment of the present invention was examined. In the arrangement, the ratio obtained by the equation A/(N+A) of atmosphere in contact with the blue light emission phosphor was equal to or greater than 0.04.

The inventors of the present invention had focused on the point where main light emission of mercury occurs in two wavelengths; one having a wavelength of 185 nm and the other having a wavelength of 253.7 nm, and that intensities of emitted light with two wavelengths in the mercury were relatively replaced with each other in response to a vapor pressure of mercury.

Mercury is not evaporated sufficiently in a fluorescent lamp when the power is ON. In the mercury, intensity of light with a wavelength of 185 nm is relatively increased when a vapor pressure of mercury is relatively low and that intensity of light with a wavelength of 253.7 nm is relatively increased when a vapor pressure is relatively high.

Figure 4A:
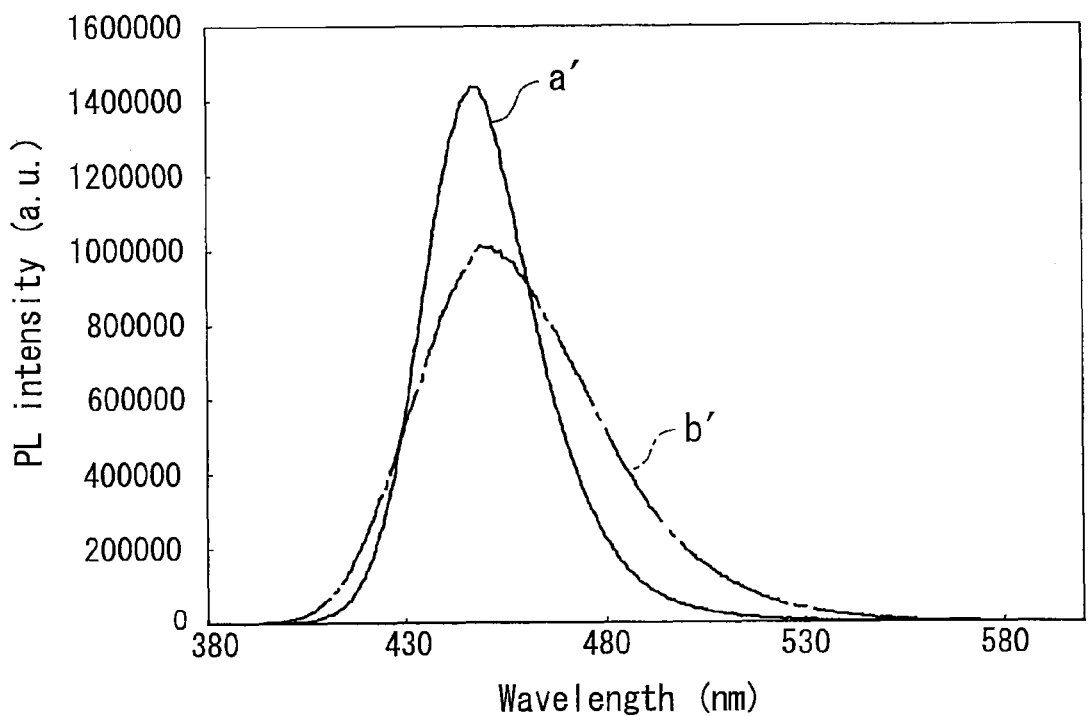
FIGS. 4A and 4B are respectively schematic diagrams illustrating photoluminescence properties of phosphors.
Figure 4B:
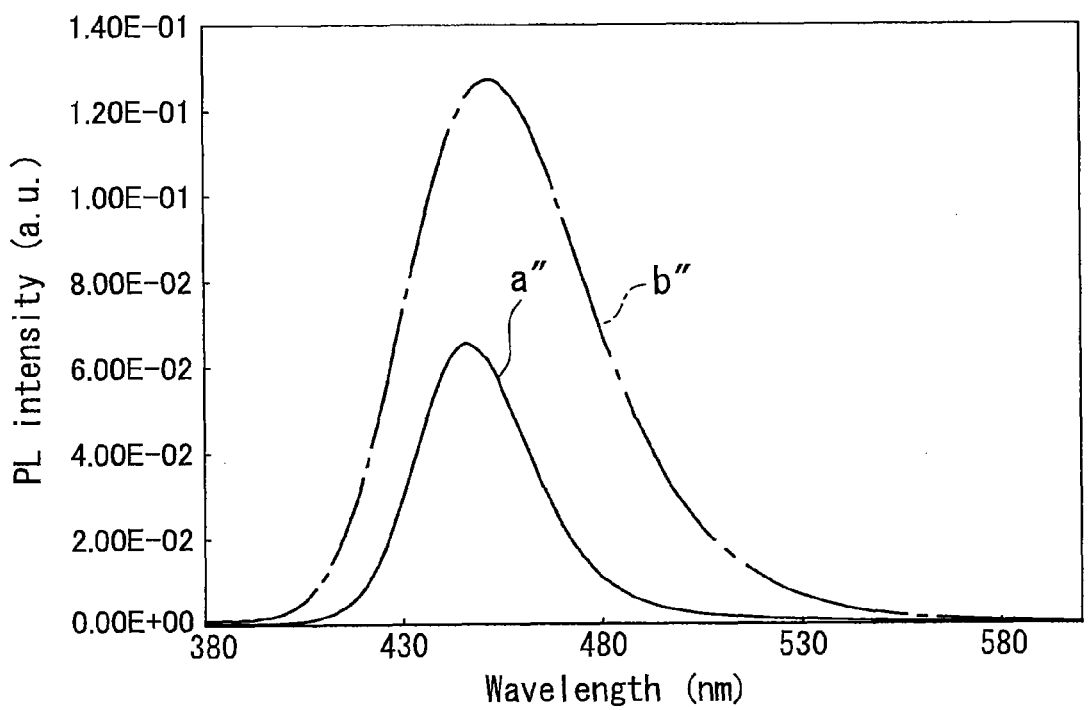
Figure 5:
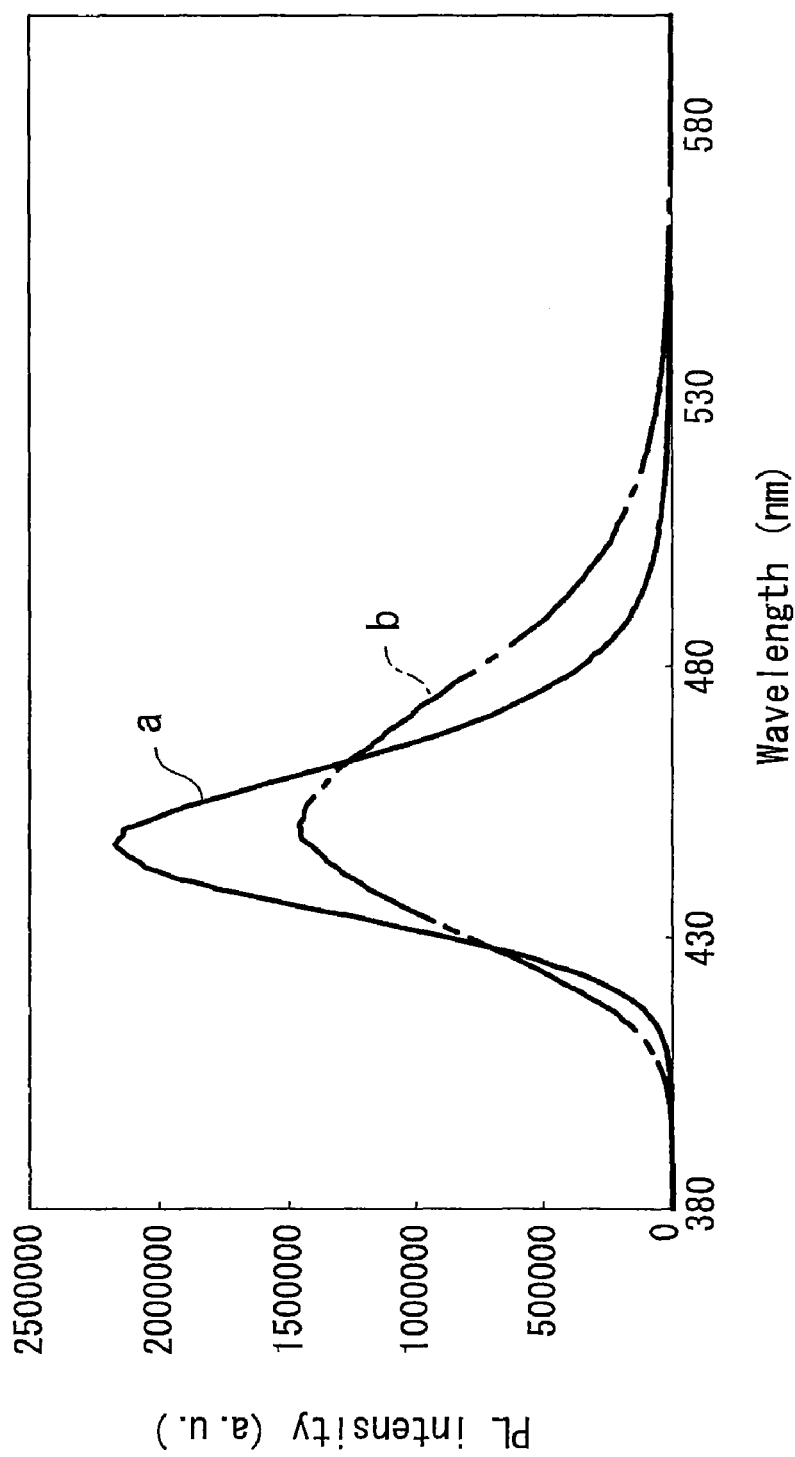
FIG. 5 is a schematic diagram showing an emission spectrum of phosphors.

FIG. 4A shows that, when ultraviolet light with a wavelength of 253.7 nm is emitted from mercury, an emission spectrum (solid line a') of SCA using the ultraviolet light as excitation light has a light emission intensity higher than that of an emission spectrum (dot and dash line b') of BAM:Eu. In contrast, FIG. 4B shows that, when ultraviolet light with a wavelength of 185 nm is emitted from mercury, an emission spectrum (solid line a") of SCA using this ultraviolet light as excitation light has a light emission intensity lower than an emission spectrum (dot and dash line b") of BAM:Eu.

The results show that a change (change in initial chromaticity) in chromaticity of emitted light in the fluorescent lamp including the SCA in the phosphor particle layer is observed as a wavelength of emitted light from mercury changes due to an increase in a temperature within the fluorescent lamp. In the chromaticity changes observed in the first CCFL and the second CCFL, intensity of light emitted from the SCA increases as a time elapses (as intensity of light with a wavelength of 253.7 nm from mercury increases).

In the fluorescent lamp according to the embodiment of the present invention, if the ratio obtained by the equation A/(N+A) is equal to or greater than 0.04, a temperature within the fluorescent lamp can be increased, so that a vapor pressure of mercury can be increased in the earliest stage immediately after the power switch of the display apparatus is turned ON, thereby suppressing changes (changed amounts; Δx, Δy) occurred later, that is, noticeable changes in a time zone by human senses.

As set forth above, according to the fluorescent lamp of the embodiment of the present invention, since the atmosphere in contact with the blue light-emission phosphor is selected so as has a ratio obtained by the equation A/(A+N)≧0.04, a change in initial chromaticity can be suppressed.

Moreover, according to the light source apparatus of the embodiment of the present invention, since the change in initial chromaticity in the fluorescent lamp can be suppressed, it is possible to supply light with stable chromaticity.

Further, according to the display apparatus of the embodiment of the present invention, it is possible to decrease deterioration of image information by suppressing a change in initial chromaticity in the fluorescent lamp.

It should be noted that the SCA has a peak of a spectrum at the short wavelength side as compared with the BAM:Eu, the phosphors thereof can exhibit excellent blue. Since only a small change in color is observed in the SCA with long-term use, and excellent coating properties can be obtained when the fluorescent lamp is manufactured.

According to the fluorescent lamp of the embodiment of the present invention, many advantages can be provided in the practical use of the SCA by suppressing a change in initial chromaticity. Specifically, according to the fluorescent lamp of the embodiment of the present invention, it is possible to use the SCA that exhibits a spectrum and having a half width narrower than that of the BAM:Eu and a steep shape as a light emission source in a light source apparatus and a display apparatus with a small change in initial chromaticity.

Further, according to the fluorescent lamp of the embodiment of the present invention, since the fluorescent lamp includes the SCA with small light emission in the green region as the blue light-emission phosphor thereof, when a display apparatus formed, green light resulting from the blue light-emission phosphor can be suppressed from being mixed into a green color filter. Accordingly, in an apparatus including the fluorescent lamp according to the embodiment of the present invention, not only color purity of blue but also color purity of green can be improved.

Moreover, in the fluorescent lamp according to the embodiment of the present invention, since the fluorescent lamp is configured such that an increase in a temperature of mercury can be promoted by selecting the ratio of argon and neon which are inexpensive as compared with other rare gas elements, reduction in cost can be achieved.

While the embodiments and examples of the fluorescent lamp, the light source apparatus and the display apparatus according to the present invention have been described so far, usable materials and amount of such usable materials given as examples in the descriptions of the embodiments and numerical conditions such as treatment times and dimensions are merely suitable examples and dimensions, shapes and layout relationships in the sheets of drawings for use with the descriptions also are schematic ones. That is, the present invention is not limited to the embodiment of the present invention.

For example, while the arrangement in which the phosphor particle layer contains the blue light-emission phosphor, the green light-emission phosphor and the red light-emission phosphor has been described so far in the aforementioned embodiments by way of example, the phosphor particle layer may contain phosphors corresponding to light emission colors such as cyan, magenta, and yellow.

DESCRIPTION OF REFERENCE NUMERALS 1 fluorescent lamp, 2 glass tube, 3 phosphor particle layer, 4 electrode, 5 Dumet wire, 6 bead glass, 11 display apparatus, 12 light source apparatus, 13 optical apparatus, 14 reflector, 15 reflector, 16 light guide portion, 19 diffusion sheet, 20 deflection plate, 21 TFT glass substrate, 22 dot electrode, 23 liquid-crystal layer, 24 orientation film, 25 electrode, 26 black matrix, 27a first color filter, 27b second color filter, 27c third color filter, 28 glass substrate and 29 deflection plate

The invention claimed is:

1. A fluorescent lamp comprising:
a phosphor layer consisting of:
a blue light-emission phosphor expressed by the following compositional formula:

$(Sr_x, Ba_y, Ca_{(1-x-y)})_5(PO_4)_3Cl:Eu$ wherein $0 \leq x, y \leq 1$ and $x+y \leq 1$,
a green light-emission phosphor expressed by the following compositional formula:

BAM:Eu,Mn, a red light-emission phosphor expressed by the following compositional formula:

$YVO_4$:Eu, and nitrocellulose; and
an atmosphere in contact with the blue light-emission phosphor that contains argon (Ar), neon (Ne) and mercury (Hg) having a ratio shown by the following equation:

$A/(A+N) \geq 0.04$ wherein A represents a mole fraction of argon and N represents a mole fraction of neon.

2. A fluorescent lamp according to claim 1, wherein the blue light-emission phosphor and the atmosphere form any one of a cold cathode fluorescent lamp and a hot cathode fluorescent lamp.

3. A fluorescent lamp according to claim 1, wherein $0.10 \geq A/(A+N) \geq 0.04$.

4. A fluorescent lamp according to claim 1, wherein the blue light-emission phosphor is selected from the group consisting of: $Sr_5(PO_4)_3Cl:Eu$, $(Sr_{0.5}, Ba_{0.5})_5(PO_4)_3Cl:Eu$ and $(Sr_{0.3}, Ba_{0.3}, Ca_{0.4})_5(PO_4)_3Cl;Eu$.

5. A light source apparatus including a fluorescent lamp, wherein
the fluorescent lamp includes a phosphor layer consisting of:
a blue light-emission phosphor expressed by the following compositional formula:

$(Sr_x, Ba_y, Ca_{(1-x-y)})_5(PO_4)_3Cl:Eu$ wherein $0 \leq x, y \leq 1$ and $x+y \leq 1$,
a green light-emission phosphor expressed by the following compositional formula:

BAM:Eu,Mn, a red light-emission phosphor expressed by the following compositional formula:

$YVO_4$:Eu, and nitrocellulose; and
an atmosphere in contact with the blue light-emission phosphor that contains argon (Ar), neon (Ne) and mercury (Hg) having a ratio shown by the following equation:

$A/(A+N) \geq 0.04$, wherein A represents a mole fraction of argon and N represents a mole fraction of neon.

6. A light source apparatus according to claim 5, wherein $0.10 \geq A/(A+N) \geq 0.04$.

7. A display apparatus including a light source apparatus, wherein
the light source apparatus includes a fluorescent lamp,
the fluorescent lamp includes a phosphor layer consisting of:
   a blue light-emission phosphor expressed by the following compositional formula:

$(Sr_x,Ba_y,Ca_{(1-x-y)})_5(PO_4)_3Cl:Eu$ wherein $0 \leq x, y \leq 1$ and $x+y \leq 1$,
   a green light-emission phosphor expressed by the following compositional formula:

BAM:Eu,Mn, a red light-emission phosphor expressed by the following compositional formula:

$YVO_4:Eu$, and nitrocellulose; and
an atmosphere in contact with the blue light-emission phosphor that contains argon (Ar), neon (Ne) and mercury (Hg) having a ratio shown by the following equation:

$A/(A+N) \geq 0.04$, wherein A represents a mole fraction of argon and N represents a mole fraction of neon.

8. A display apparatus according to claim 7, wherein $0.10 \geq A/(A+N) \geq 0.04$.

* * * * *